United States Patent [19]

Erichsen et al.

[11] Patent Number: 5,285,042
[45] Date of Patent: Feb. 8, 1994

[54] GAS TUNGSTEN ARC WELDING TORCH APPARATUS

[75] Inventors: Thomas D. Erichsen, Los Altos; Gary L. Boerman, Santa Clara; Daniel J. Richard, San Jose, all of Calif.; Ian C. B. Gordon, East Whitburn, Scotland

[73] Assignee: FMC Corporation, Chicago, Ill.

[21] Appl. No.: 981,621

[22] Filed: Nov. 25, 1992

[51] Int. Cl.⁵ .............................................. B23K 9/00
[52] U.S. Cl. .................................................... 219/75
[58] Field of Search ........................ 219/60 A, 75, 136

[56] References Cited

U.S. PATENT DOCUMENTS

| | | | |
|---|---|---|---|
| 2,571,684 | 10/1951 | Craven | 219/75 |
| 4,104,499 | 8/1978 | Luttrell et al. | 219/60 A |
| 4,629,853 | 12/1986 | Yttergren et al. | 219/60 A |

Primary Examiner—Clifford C. Shaw
Attorney, Agent, or Firm—Michael Lee; R. C. Kamp; R. B. Megley

[57] ABSTRACT

The invention provides an improved gas tungsten arc welding (GTAW) torch apparatus allows for welding on such surfaces that otherwise could not be welded with linear or 90° bend welding torch apparatuses, by providing a bend greater than 282°.

16 Claims, 2 Drawing Sheets

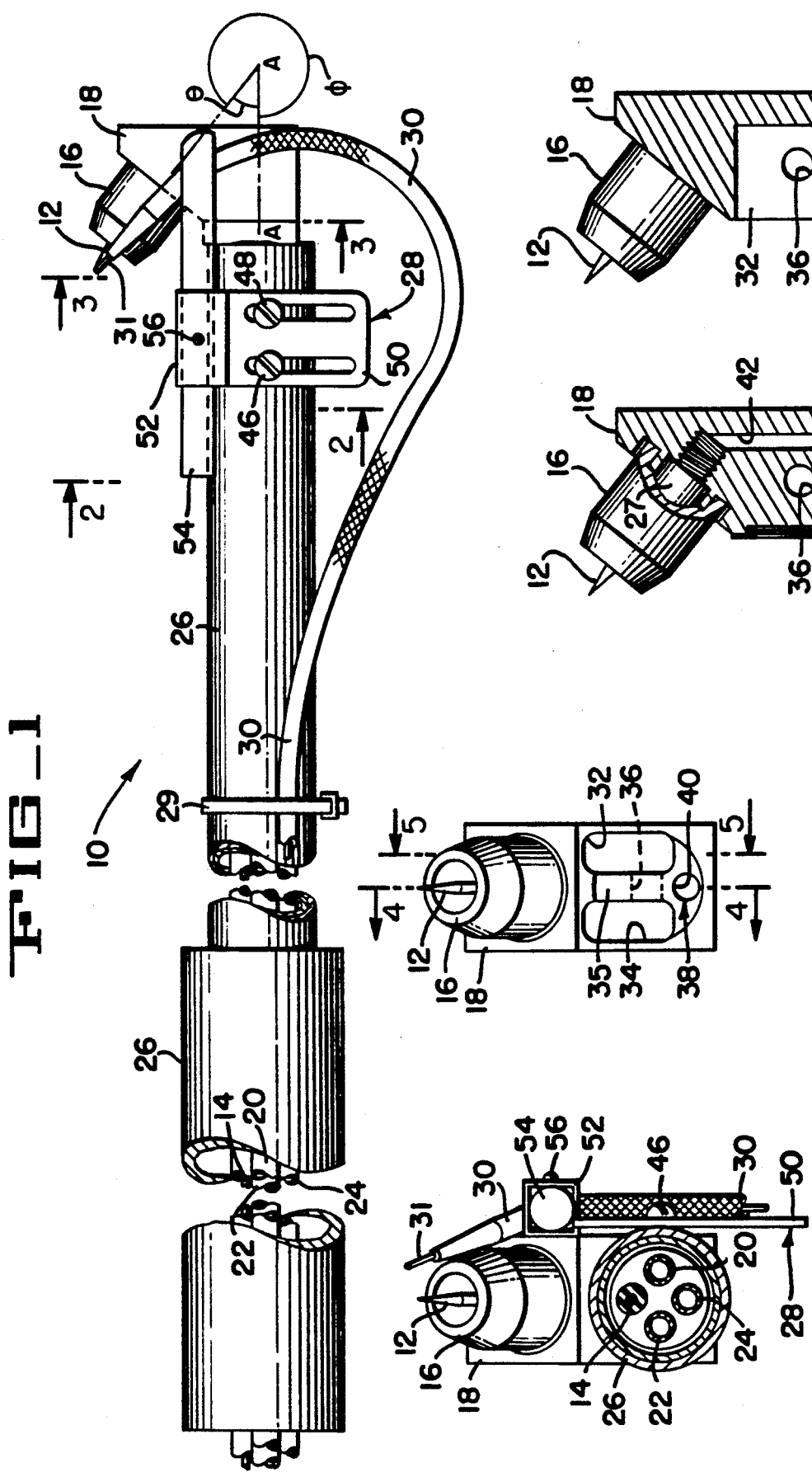

FIG_6
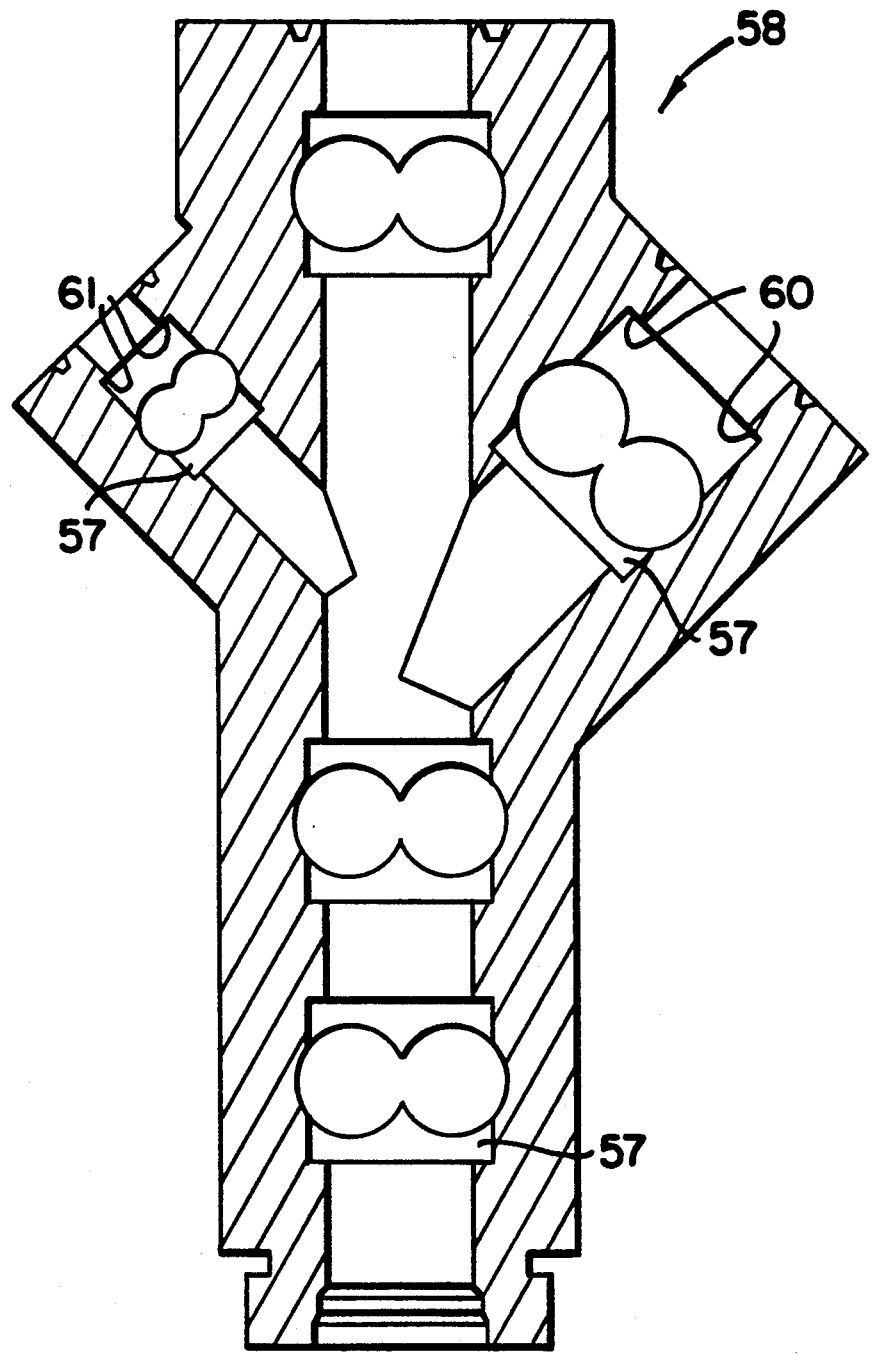

GAS TUNGSTEN ARC WELDING TORCH APPARATUS

In welding the of tubular components, sometimes it is required that welding be done on a surface that is predominately perpendicular to the major axis of the welding torch apparatus and is facing away from the non-captured end of the torch. The improved gas tungsten arc welding (GTAW) torch apparatus allows for welding on such surfaces that otherwise could not be welded with linear or 90° bend welding torch apparatuses.

FIG. 1 is a partially cut away view of a preferred embodiment of the inventive arc welding apparatus.

FIG. 2 is a cross-sectional view of the welding apparatus illustrated in FIG. 1 taken along lines 2—2 of FIG. 1.

FIG. 3 is a cross-sectional view of the welding apparatus illustrated in FIG. 1 taken along lines 3—3 of FIG. 1.

FIG. 4 is a cross-sectional view of the welding apparatus illustrated in FIG. 1 taken along lines 4—4 of FIG. 3.

FIG. 5 is a cross-sectional view of the welding apparatus illustrated in FIG. 1 taken along lines 5—5 of FIG. 3.

FIG. 6 is a cross-sectional view of a petroleum equipment block valve, where the preferred embodiment may be used.

In FIG. 1 shows a partially cut away view of a torch 10 of a preferred embodiment of the inventive arc welding torch. The torch 10 comprises an electrode 12, an electrical lead 14 electrically connected to the electrode 12, a ceramic cup 16 surrounding the electrode 12, an angular support piece 18 which mechanically supports the electrode 12 and the ceramic cup 16, a water inlet 20, a water outlet 22, a gas feed 24, a housing 26, a clamp 28 mechanically connected to the housing 26, and a material feed tube 30 held by the clamp 28. FIG. 2 is a cross sectional view of the housing 26 along line 2—2. FIG. 3 is a cross sectional view of the angular support piece 18 along line 3—3 also showing the ceramic cup 16 and the electrode 12, but with the clamp 28 removed. FIG. 4 is a cross sectional view of FIG. 3 along line 4—4. FIG. 5 is a cross sectional view of FIG. 3 along line 5—5.

The water inlet 20, water outlet 22, and gas feed 24 are formed by tubes. The electrical lead 14 is formed by an insulated wire. The housing 26 is formed by linear tubes joined together with a first end and a second end, which surrounds the water inlet 20, water outlet 22, gas feed 24, and electrical lead 14. The housing formed by linear tubes has an axis, which extends from the first end of the housing 26 to the second end of the housing 26 shown by line A—A. The second end of the housing 26 is mechanically connected to the angular support piece 18. A first aperture 32 in the angular support piece 18 is connected to the water inlet 20. A second aperture 34 in the angular support piece 18 is connected to the water outlet 22, with a dividing wall 35 dividing the first aperture 32 from the second aperture 34. A connecting hole 36, which passes through the dividing wall 35, connects the first aperture 32 to the second aperture 34. A bent passageway connected to the gas feed 24, wherein the bent passageway 38 has a outlet inside the ceramic cup 16. The bent passageway 38 is formed by drilling a first channel 40 and then drilling a second channel 42 substantially perpendicular to the first channel 40. A plug 44 is then used to seal an opening from the second channel 42. The angular support piece 18 is mechanically connected between the second end of the housing 26 and the ceramic cup 16. The electrode 12 is placed along the central axis of the ceramic cup 16, wherein the electrode is electrically connected to the angular support piece 18, which is electrically connected to the electrical lead 14. In the preferred embodiment, the electrode is a linear piece of tungsten with a first end and a second end. The first end of the electrode 12 is mechanically connected to the angular support piece 18 by a collet body 27. The second end of the of the electrode 12 is pointed. The length of the housing 26 from the first end of the housing 26 to the second end of the housing 26 and the length of the electrode 12 from the first end of the electrode 12 to the second end of the electrode 12 forms an acute angle $\theta$ of 61° and a conjugate reflex angle $\phi$ of 299°. In other embodiments the acute angle $\theta$ may range from 40° to 78° with the conjugate reflex angle ranging from 282° to 320°.

In the preferred embodiment, the clamp 28 is mechanically connected to the housing 26 by a first screw 46 and a second screw 48. The clamp is formed by a flange 50 with slots to accommodate the screws 46,48 and a holding piece 52 for holding a rod 54. The rod 54 is kept from sliding in the holding piece 52 by a third screw 56. The material feed tube 30 is supported against the housing 26 by a strap 29 and passes through the holding rod 54, which provides additional support to the material feed tube 30. One end of the material feed tube 30 is placed adjacent to the electrode 12 and the ceramic cup 16. The support provided by the housing 26 and the holding rod 54 for the material feed tube 30 causes the material feed tube 30 to bend approximately 299°, wherein all points along the bend have a radius of curvature greater than 1 inch.

In operation of the preferred embodiment the torch 10 is connected to a control unit, not shown, by connecting the water inlet 20 to a water supply, the water outlet 22 to a water exhaust, the gas feed 24 to a gas source, the electrical lead 14 to an electrical source, the material feed tube 30 to feed material source, and the housing 26 to a mechanical support means. Water flows from the water supply to the water inlet 20, through the first aperture 32, through the connecting hole 36, through the second aperture 34, through the water outlet 22, and to the water exhaust. The flowing water provides cooling to the angular support piece 18, the ceramic cup 16, and the electrode 12. The second end of the electrode 12 is placed near a work piece. An inert gas flows from the gas source through the gas feed 24, through the bent passage 38, through the ceramic cup 16 and around the electrode 12. The flowing gas makes an approximately 299° bend and is used to prevent the electrode 12 and the work piece from oxidizing. Either a DC or AC voltage passes from an electrical source through the electrical lead 14, through the angular support piece 18, through the electrode 12 to the work piece, creating an arc between the electrode 12 and the work piece. The arc between the electrode 12 and the work piece causes the work piece to heat to a high temperature causing a local area of the work piece to melt. A feed material 31 is fed through the material feed tube 30 to the area of the arc and is melted on to the work piece. The mechanical support means is used to maintain the electrode 12 near the work piece.

FIG. 6 illustrates a sample work piece 58 where the preferred embodiment would be useful. The work piece is part of a petroleum equipment block valve commonly used in petroleum operations. Fluid flows through the pipes along the plane of the page. Valves 57 are inserted and retracted through bores perpendicular to the plane of the page. The work piece 58 has a first surface 60 where it would be desirable to place arc welded material which resists corrosion. Such material is desirable along the edge crevices of the valves 57 where corrosion is more likely to occur. Prior art arc welders were either linear or had a 90° bend or had a bend between being linear or 90°. Such arc welders were unable to provide welding on the first surface 60 or second surface 61. The preferred embodiment would provide quality welds to the first surface 60 or second surface 61 to apply a quality noncorrosive layer. The preferred embodiment in addition provides water cooling and a material feed tube.

The ceramic cup 16 of the preferred embodiment could be replaced by other insulative material. The torch could also use coolants other than water or could be air cooled. Other embodiments may not have a dividing wall 35 so that the first aperture 32 and the second aperture 34 form a single aperture.

While a preferred embodiment of the present invention has been shown and described herein, it will be appreciated that various changes and modifications may be made therein without departing from the spirit of the invention as defined by the scope of the appended claims.

What is claimed is:

1. An arc welding apparatus, comprising:
   an electrical lead;
   a gas feed pipe;
   a housing adjacent to the gas feed pipe, wherein the housing has a first end and a second end and a linear length extending from the first end of the housing to the second end of the housing;
   a angular support piece mechanically connected to the second end of the housing;
   an electrode with a first end and a second end, wherein the first end of the electrode is electrically connected to the electrical lead and mechanically connected to the angular support piece at a fixed angle with respect to the housing, and wherein the electrode has a length from the first end to the second end, and wherein the length of the housing and the length of the electrode form a reflex angle within the range from 282° to 320°;
   a cup of electrically insulative material surrounding the electrode and mechanically connected to the angular support piece; and
   a feed tube with a length adjacent to the housing and with a first end adjacent to the electrode, wherein the feed tube forms an arc greater than 282°.

2. An apparatus, as claimed in claim 1, wherein the length of the housing and the length of the electrode form an acute angle within the range from 40° to 78°.

3. An apparatus, as claimed in claim 2, wherein the angular support piece comprises an electrically conductive body and is electrically connected between the electrical lead and the electrode.

4. An apparatus, as claimed in claim 3, further comprising a water inlet pipe and a water outlet pipe, and wherein the angular support piece forms a first channel passing from the water inlet pipe to the water outlet pipe and a second channel passing from the gas feed pipe to the cup.

5. An apparatus, as claimed in claim 4, wherein the electrode is tungsten.

6. An apparatus, as claimed in claim 5, wherein the cup is ceramic.

7. An apparatus, as claimed in claim 1, wherein the electrode is tungsten.

8. An apparatus, as claimed in claim 1, wherein the cup is ceramic.

9. An arc welding head apparatus, comprising:
   a housing with a first end and a second end and a linear length extending from the first end of the housing to the second end of the housing;
   a angular support piece mechanically connected to the second end of the housing;
   an electrode with a first end and a second end, wherein the first end of the electrode is mechanically connected to the angular support piece at a fixed angle with respect to the housing, and wherein the electrode has a length from the first end to the second end, and wherein the length of the housing and the length of the electrode form a reflex angle within the range from 282° to 320°; and
   a feed tube adjacent to the housing and with a first end adjacent to the electrode, wherein the feed tube forms an arc greater than 282°.

10. An apparatus, as claimed in claim 9, further comprising a cup of electrically insulative material surrounding the electrode and mechanically connected to the angular support piece.

11. An apparatus, as claimed in claim 10, wherein the electrode is tungsten.

12. An apparatus, as claimed in claim 11, wherein the cup is ceramic.

13. An apparatus, as claimed in claim 9, further comprising:
   a water inlet extending the length of and within the housing;
   a water outlet extending the length of and within the housing;
   a gas feed extending the length of and within the housing; and
   an electrical lead extending the length of and within the housing.

14. An apparatus, as claimed in claim 13, wherein the angular support piece comprises an electrically conductive body with a first channel passing from the water inlet to the water outlet and a second channel passing from the gas feed to the cup, and wherein the body of the angular support piece is electrically connected between the electrical lead and the electrode.

15. An apparatus, as claimed in claim 14, wherein the electrode is tungsten.

16. An apparatus, as claimed in claim 15, wherein the cup is ceramic.

* * * * *